United States Patent Office 3,576,786
Patented Apr. 27, 1971

3,576,786
EPOXY-AZIRIDINE POLYMER PRODUCT
Sarkis H. Kalfayan, La Canada, and Barbara A. Campbell, Anaheim, Calif., assignors to the United States of America as represented by the Administrator of the National Aeronautics and Space Administration
No Drawing. Filed Sept. 27, 1968, Ser. No. 763,355
Int. Cl. C08g 30/14
U.S. Cl. 260—47
1 Claim

ABSTRACT OF THE DISCLOSURE

A polymeric product resulting from the reaction of polyfunctional epoxy resins with polyfunctional aziridine compounds.

ORIGIN OF INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

(1) Field of the invention

The invention is in the field of polymers. More particularly, the invention relates to new infusible polymers resulting from the reaction of polyfunctional epoxy resins with polyfunctional aziridine compounds.

(2) Description of the prior art

Epoxy resins are quite common. These are thermosetting resins which are based on the reactivity of the epoxide group. A typical epoxy resin results from the reaction product of epichlorohydrin and bisphenol A. These materials cure readily with amine catalysts. The epoxy resins find use in an extreme variety of applications, which include surface coatings, adhesives, potting of electrical parts, structural elements, and the like. Since the epoxy resins have such wide application, there is continuing interest in forming new products with the materials or to find new cross linking agents for those polymers. One would like to further improve electrical properties, strength properties, and the like, utilizing the basic epoxies available.

In the course of prior investigation, under certain conditions it has been found that epoxy resins and aziridines have individually homopolymerized without the aid of a cross linking agent. Others have attempted to polymerize a monofunctional aziridine with a monofunctional epoxy resin. No copolymerization resulted. The products obtained were on the order of a viscous oil. Another effort concerned reacting a polyfunctional epoxy resin with a monofunctional aziridine containing an active hydrogen. Unlike the herein invention, polymerization occurred through this active hydrogen with no opening of the aziridine ring. There was no indication that infusible products could result from polyfunctional aziridines.

SUMMARY OF THE INVENTION

It has been unexpectedly found that when polyfunctional aziridines are reacted with polyfunctional epoxy resins, infusible polymers are obtained. The resultant products have excellent physical properties, together with high temperature stability so that they can be used to obtain improved results in many applications where epoxy resins are currently found. Additionally, the infusible polymeric product results from a rapid low temperature cure which is similar to that heretofore obtained with amine catalysts used for epoxy resins. It is believed that the invention will be better understood from the following detailed description and specific examples.

DESCRIPTION OF PREFERRED EMBODIMENTS

As indicated above, the herein invention comprises a polymer formed from two reactants. The first component is a polyfunctional epoxy resin, that is, an epoxy resin that has more than one epoxide group per molecule. The epoxy resin should preferably be at least difunctional. However, the epoxy resins normally available are not more than 90% pure. As a result, a practical lower limit for the functionality of the epoxy resins utilized is 1.7. Thus, any multifunctional available epoxy resin is contemplated, having a functionality, for example, up to 4, and molecular weights up to several thousand. Generally, the epoxides will have a functionality of 2 to 3. The molecular weight is of no moment as long as there are active epoxy groups.

General examples of the types of epoxy resins available include, for example, the glycidyl ether resins such as the glycidated novolac resins, a tetraphenylol ethane-epichlorohydrin resin and bisphenol A-epichlorohydrin resins. Additionally, included are the epoxidized olefins such as, for example, the cycloaliphatic epoxy resin-carboxylate type, bis(2,3-epoxycyclopentyl) ether and vinylcyclohexene dioxide. Specific examples include the diglycidyl ether of Bisphenol A based resin, N,N-diglycidyl-p-aminophenyl glycidyl ether, 2,6-(2,3-epoxypropyl)phenyl glycidyl ether, and diglycidyl ether of poly(propylene) oxide.

The polyfunctional aziridines utilized in the performance of the herein invention have more than one aziridine ring structure per molecule and have the general formula:

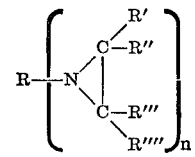

where:

$n = 2$ to $3$

R', R'', R''' and R'''' are individually selected from the group consisting of H, $CH_3$, $C_2H_5$ and $C_3H_7$ and, R is selected from the group consisting of alkylene and arylene radicals of 1 to 12 C atoms, such radicals selectively including ether linkages, carboxyl, ester and sulfonyl groups; phosphonate, and thiophosphonate groups.

Typical non-limiting selective examples of R include:

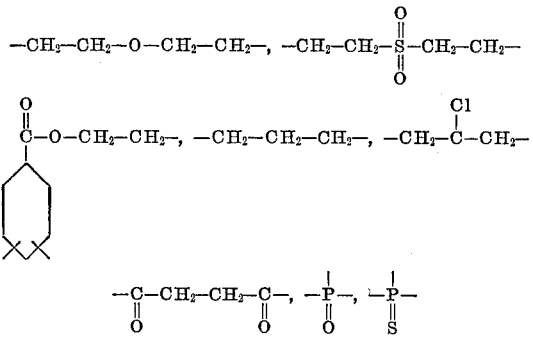

As can be appreciated, the only important requirement for the aforegoing aziridine is that there be more than one aziridinyl group present per molecule. A further desirable property is that the nitrogen atom not be hindered, so that nitrogen to carbon bonds are readily available for a cross linking with the epoxy resin. For example, when the N is connected directly to a carboxyl grouping, the reaction is slower, but still provides sufficient end products. It should now be apparent that R can be almost any substituent group since it does not enter into the cross linking reaction with the epoxy groups. These aziridine compounds are prepared by well-known techniques and many are commercially available. Typical examples of the aziridine compounds include (2,2-dimethyl heptanedioyl) 1,1 - diaziridine, bis(2 - methyl aziridinyl ethyl) sulfone, N-phenethyl aziridine, tris-[2- (1 - aziridinyl)ethyl] trimellitate, and the like. Like the epoxides, the aziridine compounds are not generally obtainable in extremely pure form. Thus, the minimum functionality that can be tolerated to produce successful results is an average of 1.7 aziridinyl groups per molecule.

Generally, to obtain a maximum amount of cross linking, the epoxide and aziridine compounds are reacted stoichiometrically based on the equivalents of reactive groups in each compound. In other words, it is desirable that there be an aziridinyl group present for each epoxy one, or vice versa. However, good results can be obtained with not as great a quantity of aziridine. One can obtain desirable polymers with as low as 80% of the stoichiometric equivalency of the aziridine being present. Alternatively, while it would not be necessary, the aziridine can be present in as high as 120% of the stoichiometrical equivalency based on the epoxide groups of the epoxy compound.

There will be some curing of the aziridine and epoxy utilized over a long period of time at room temperatures. The materials begin to cure well at 70° C. As with most polymer systems, a more rapid cure can be effected at elevated temperatures. One advantage of the herein invention is that rapid curing can be effected at temperatures that are not extremely high. With some systems, the components have a gel time at 100° C. of 0.20 hour, or in other words, 12 minutes.

The completion of the cure will of course vary depending, as indicated, upon temperature, and also upon the reactants utilized. It has been found that a great variance as to cure time does in fact occur, depending upon the epoxy resin and aziridine chosen. There are, of course, many ways to easily determine when the cure is complete, such as spectral analysis of the polymer or by measuring the electrical resistivity of the material, or by when the hardness of the product has stabilized. A complete and final cure can be obtained with most of the materials of this invention within a matter of hours at a temperature of 100° C. At this temperature, curing will generally be complete within one to three hours, the time variance generally being affected by the aziridine used.

Catalysts are not required to effect the reaction between the epoxides and aziridines within the relatively short period of time at the moderate temperature conditions. In fact, catalysts were generally avoided in order to prevent possible side reactions such as homopolymerization of either or both of the two reactants rather than the crosslinking or copolymerization.

The specific reaction occurring between the epoxide and aziridine is not fully understood. For example, there could occur the formation of copolymers, blend of homopolymers, or block polymers. As previously indicated, it is well known that epoxides are homopolymerized when catalyzed with tertiary amines. It was initially thought that perhaps the aziridines which are weakly basic might be catalyzing homopolymerization of the epoxides. This was especially true of some of the aziridines which had structures quite similar to tertiary amines. However, Epon 828 made by the Shell Chemical Company, which is a liquid diglycidyl ether-bisphenol A based resin having an epoxide value from 170 to 190, was treated with 5 weight percent of three different multifunctional aziridines and with the same weight percent of benzyl dimethyl amine, which is a commonly used tertiary amine catalyst. The epoxy gelled with the benzyldimethyl amine at 10 minutes at 100° C., whereas no gelation occurred after 48 hours at 100° C. with any of the aziridines utilized. This clearly indicates that the aziridines are not serving as catalysts for homopolymerization of the epoxy.

In attempting further to analyze the type of reaction occurring Epon 828 was reacted with difunctional aziridines, and followed by an infrared spectroscopy. It was found that the rate of reduction of band intensity, or in other words, concentration of the aziridines, was much higher than that of the epoxy. If a strict copolymerization were occurring, the rates of reduction of band intensity for both the epoxy resin and the aziridine would be the same. The faster consumption of the aziridines indicate probably some homopolymerization occurring. The absorbence bands of the epoxy group were found to be greatly diminished and disappeared after prolonged heating. This indicates that the epoxy resin was reacting later to form the infusible product.

It is believed the invention will be better understood from the following examples of prepared polymer compositions. Prior to formulating the compositions, the epoxy resin utilized was analyzed for epoxy equivalent value by standard techniques. This consisted of a reaction with hydrochloric acid solution and backtitration of excess acid. Additionally, the aziridine compound used was analyzed for its aziridine equivalent value by a standard technique of reaction with a thiosulfate salt. The parts by weight set forth in the examples reflect a stoichiometric ratio of the two reactants based on the equivalency of the epoxy and aziridine groups in each.

EXAMPLE I

This example utilized Epon 828, manufactured by Shell Chemical Company, which is a diglicydyl ether of Bisphenol A based resin, and NC1455 made by the Dow Chemical Company, which is tris-[2-(1-aziridinyl)ethyl] trimellitate, 25 parts by weight of the Epon 828 were mixed with 20 parts by weight of the NC1455, based on the predetermined epoxy and aziridine values to obtain a stoichiometric ratio. The two were mixed thoroughly. The mixture was then degassed for five minutes below 3 mm. of mercury pressure to eliminate air bubbles. The mixture was then poured into a suitable mold which was an aluminum dish and cured in an air oven. The temperature of the oven was set at 100° C. The mixture was carefully observed during its residency time in the oven. Gelling occurred in 15 minutes. A Shore D hardness of 75 was obtained in one hour. Then the same piece was cured an additional 23 hours. The formed material then had a flexural strength of 18,000 p.s.i. and a modulus of 440,000 p.s.i. This material possessed a Shore D hardness of 84 after the 24-hour cure.

EXAMPLE II

Once again, Epon 828 was utilized with a different aziridine compound. The aziridine was HX740 made by 3M Company. This compound is (2,2-dimethyl heptanedioyl) 1,1-diaziridine. 25 parts of the Epon 828 were mixed with 17 parts of the HX740. The mixture was degassed and prepared in the same way as set forth in Example I. The oven utilized was again kept at 100° C. This formulation gelled at 5½ hours. At the end of 24 hours, a Shore D hardness reading of 71 was obtained.

EXAMPLE III 40 parts by weight of Epon 828 were mixed with 25 parts by weight of ZC466, which is bis(2-methyl aziridinyl ethyl) sulfone. The procedures and temperatures of Example I were repeated. The mixture gelled in 33 minutes. At the end of 24 hours, a Shore D hardness of 83 was obtained. The sample was then left at room temperature for an additional 7 days. At the end of this period, the material had a Shore D hardness of 84, indicating that it was essentially completely cured within the 24-hour period. In this example, the epoxy resin Shell X801, manufactured by the Shell Chemical Company, was utilized. This material is 2,6-(2,3-epoxypropyl)phenyl glycidyl ether. 20 parts by weight of the Shell x 801 was mixed with 32 parts by weight of NC1455 under the conditions and temperatures of Example I. It was found that this mixture gelled in 25 minutes. At the end of 24 hours, it obtained a Shore D hardness of 85.

EXAMPLE IV

In this example a different epoxy again was utilized. The material was ERL0510, manufactured by Union Carbide. This is N,N-diglycidyl-p-aminophenyl glycidyl ether. 50 parts by weight of ERL0510 were mixed with 63 parts by weight of ZC466, under the temperatures and conditions of Example I. This mixture gelled in 90 minutes. At the end of 24 hours it had a Shore D hardness of 85.

EXAMPLE V 40 parts by weight of ERL0510 and 60 parts by weight of NC1455 were mixed again at the conditions and temperatures of Example I. This mixture gelled in 20 minutes. At the end of the 24-hour period, a Shore D hardness of 87 resulted.

What is claimed is:
1. The product formed from the reaction of a polyfunctional epoxy resin containing at least an average of 1.7 functional epoxy groups per molecule of resin and an aziridine selected from the group consisting of tris-[2-(1-aziridinyl) ethyl]trimellitate, and bis(2-methyl aziridinyl ethyl) sulfone, wherein at least 80% of the stoichiometric equivalency of the aziridine is present based on the epoxy functionality of the epoxy resin.

References Cited

UNITED STATES PATENTS

| | | | |
|---|---|---|---|
| 3,355,437 | 11/1967 | Tesoro et al. | 260—2ENX |
| 3,079,367 | 2/1963 | Fram et al. | 260—47EP |
| 3,134,784 | 5/1964 | Seeger et al. | 260—47EP |

WILLIAM H. SHORT, Primary Examiner

T. E. PERTILLA, Assistant Examiner

U.S. Cl. X.R.

117—161ZB; 161—184R; 260—2N, 2EN, 59R